United States Patent [19]
Inoue et al.

[11] Patent Number: 6,075,520
[45] Date of Patent: Jun. 13, 2000

[54] SMALL CURRENT DETECTOR CIRCUIT AND LOCATOR DEVICE USING THE SAME

[75] Inventors: Kinya Inoue, Tokyo; Mitsuharu Iwasaki, Kyoto; Yasuhiro Niwa, Kyoto; Motoharu Ishigaki, Kyoto, all of Japan

[73] Assignees: Rohm Co., Ltd., Kyoto; Alps Electric Co., Ltd., Tokyo, both of Japan

[21] Appl. No.: 08/969,563

[22] Filed: Nov. 13, 1997

[30] Foreign Application Priority Data

Nov. 15, 1996 [JP] Japan .................................... 8-320976
Feb. 20, 1997 [JP] Japan .................................... 9-052260

[51] Int. Cl.$^7$ ............................................... G09G 5/00
[52] U.S. Cl. ..................... 345/173; 345/174; 178/18.01; 178/18.06
[58] Field of Search .............................. 345/50, 80, 173, 345/174, 520, 521, 966; 340/712; 178/18.01, 18.06; 327/52, 53, 96, 563

[56] References Cited

U.S. PATENT DOCUMENTS

| | | | |
|---|---|---|---|
| 4,600,807 | 7/1986 | Kable | 178/19 |
| 5,053,757 | 10/1991 | Meadows | 340/712 |
| 5,270,711 | 12/1993 | Knapp | 341/34 |
| 5,305,017 | 4/1994 | Gerpheide | 345/174 |
| 5,349,303 | 9/1994 | Gerpheide | 330/257 |
| 5,386,219 | 1/1995 | Greanias et al. | 345/174 |
| 5,565,658 | 10/1996 | Gerpheide et al. | 178/19 |
| 5,796,389 | 8/1998 | Bertram et al. | 345/173 |

*Primary Examiner*—Richard A. Hjerpe
*Assistant Examiner*—Henry N. Tran
*Attorney, Agent, or Firm*—Beall Law Offices

[57] ABSTRACT

The improved small current detector circuit and locator device each include a first and a second capacitor, a pulse drive circuit which drives one terminal of each capacitor by a pulse signal and charges and discharges the capacitors in synchronism with the rise and fall of the applied pulse so as to generate a first and a second detection signal at the other terminal of each capacitor. A current generator circuit receives the first and second detection signals and generates a current representing the difference between the levels of said signals. An integrator circuit integrates the output current from the current generator circuit. At least one of the first capacitor or second capacitor is provided in a detection portion of the detector circuit or locator device.

12 Claims, 7 Drawing Sheets

FIG.4(a) DRIVE PULSE P

FIG.4(b) CONTROL SIGNAL S1

FIG.4(c) OUTPUT VOLTAGE FROM CAPACITORS Ca AND Cb

FIG.4(d) OUTPUT OF DIFFERENTIAL CURRENT GENERATOR CIRCUIT 15

SMALL CURRENT DETECTOR CIRCUIT AND LOCATOR DEVICE USING THE SAME

BACKGROUND OF THE INVENTION

This invention relates to a small current detector circuit and a locator device that uses it. The small current detector circuit is specifically of a type that detects small currents (charge currents) which are generated upon charging or discharging of capacitive or electrostatic sensors such as capacitive position sensors, piezoelectric sensors, capacitive humidity sensors, static field sensors, electrostatic digitizers and locator devices. The locator device is of a type that detects the charge current difference in a pair of capacitors. When electrode pairs in a grid pattern are scanned as capacitor pairs with a finger, touch detection signals each having two peaks, one being greater and the other smaller than a specified reference level, are generated in the area around the touched electrodes and sampled from the small current detector circuit. The invention relates particularly to a locator device having electrodes arranged in a grid pattern on small pitch and which is capable of detecting touched positions with high accuracy compared to the width of finger touch and which requires no readjustments for each product in assembly line.

The locator device is used as a substitute pointing device for the mouse, track ball and quick pointer on a computer system. The locator device has an electrostatic sensor portion comprising multiple X and Y electrodes arranged in a grid pattern and the position of a touched electrode is detected by detecting the difference in capacitance between electrode pairs. For detecting the position of the touched electrode, X or Y electrodes are scanned with adjacent electrodes taken as a set. The difference in capacitance between two capacitors formed by a pair of electrodes and another electrode in a face-to-face relationship with the pair is detected as a difference in charge current by means of the small current detector circuit and output as a detection signal.

Figure 8:
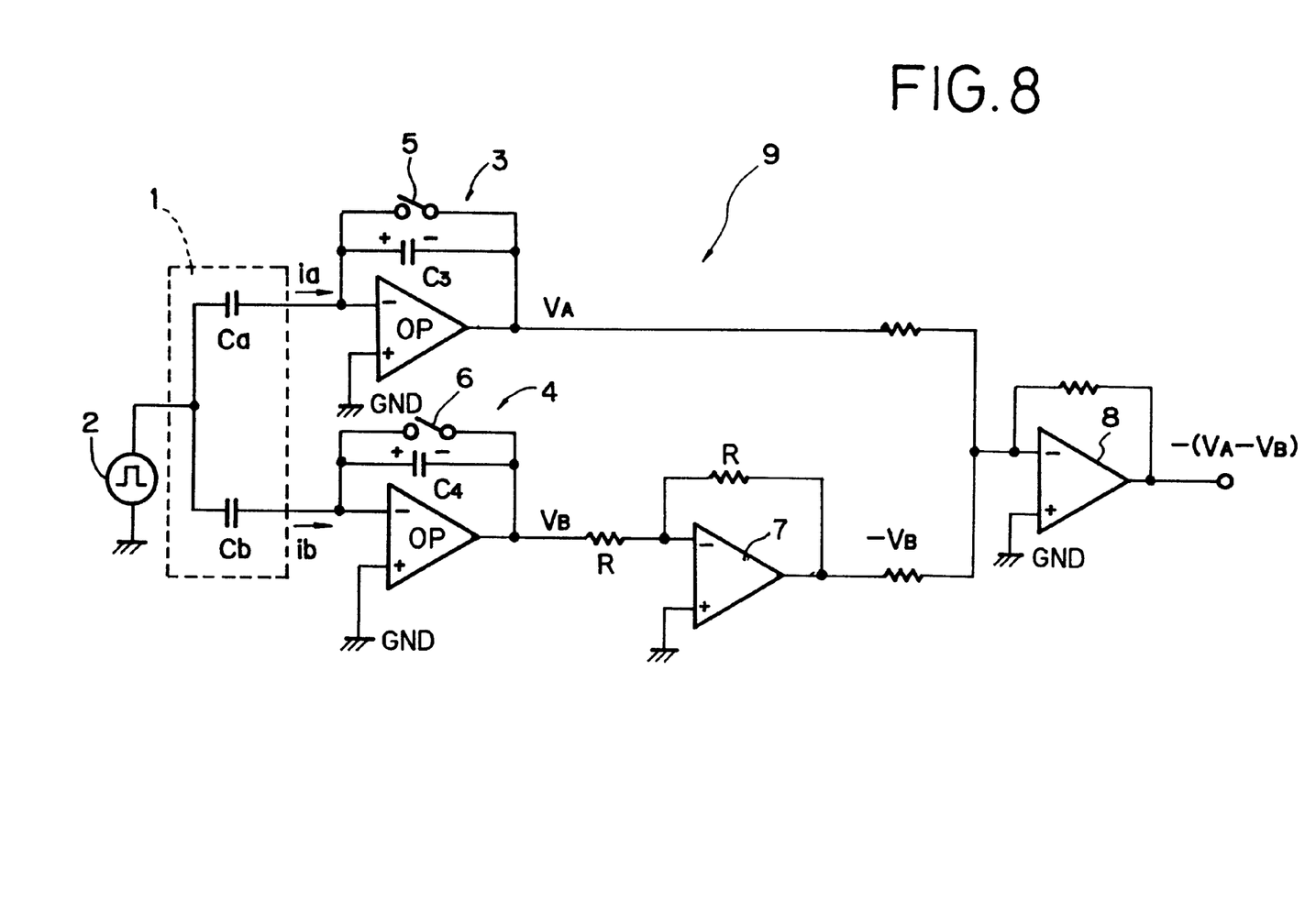
FIG. 8 is a block diagram showing a prior art small current detector circuit.

A prior art small current detector circuit for use with capacitive or electrostatic sensors is shown in FIG. 8 and may be described as an electrostatic sensor circuit, or a charge current detector circuit for detecting the charge current generated upon charging of a capacitor.

Referring to FIG. 8, the charge current detector circuit which is generally indicated by 9 has an electrostatic position sensor portion 1 having two capacitors Ca and Cb, one of which (Ca in the case under consideration) serves as a charge current detecting sensor, or a so-called "touch" sensor, having a surface that can be touched from the outside. The detector circuit 9 also includes a pulse drive circuit 2 which applies drive pulses to either terminal of each capacitor at specified periods. The other of the terminals of capacitors Ca and Cb are connected to the inverting inputs of operational amplifiers (OP) 3 and 4, respectively.

The operational amplifiers 3 and 4 are each an inverting amplifier, with its non-inverting input being connected to the ground. The output voltages VA and VB of the respective operational amplifiers are fed back to the inverting inputs via feedback capacitors C3 and C4. Initializing switches 5 and 6 are provided parallel to respective capacitors C3 and C4. Prior to a detecting operation, these switch circuits are turned on for a specified period in response to a control signal as from a controller or the like.

The output voltage VB of operational amplifier 4 is supplied via a resistor R to the inverting input of a buffer amplifier 7 which is capable of inverted amplification. The amplifier 7 has a feedback resistor R which is equal in value to the resistor R provided between the output of operational amplifier 4 and the inverting input of said amplifier 7, whereby the amplification factor of the buffer amplifier 7 is adjusted to unity. Hence, the output voltage VB of operational amplifier 4 is simply inverted to produce a negative voltage signal −VB, which is delivered as an output voltage from the amplifier 7.

The output voltage (−VB) of buffer amplifier 7 and the output voltage (VA) of operational amplifier 3 are summed in an adder 8 which is capable of inverted amplification. Since the buffer amplifier 7 produces an output which is an inversion of the output from the operational amplifier 4, what actually occurs is the substraction of the output (VB) of operational amplifier 4 from the output voltage VA of operational amplifier 3, with −(VA−VB) being produced as an output from the adder 8. In the circuit configuration described above, when a difference occurs between the capacitances of capacitors Ca and Cb, the quantity of the charge building up in one capacitor becomes different from that in the other capacitor, creating a difference in the flowing charging current. In response to this difference, a detection signal will accordingly be obtained at the output of the adder 8.

The detecting operation is the same irrespective of whether.it is accomplished by the operational amplifier 3 or 4 and, hence, the following description concerns only the operational amplifier 3. First, the switch circuit 5 is turned on for a specified period in the initial state. Since the inverting and non-inverting inputs of the operational amplifier 3 are virtually shorted, the turning on of the switch circuit 5 causes the output of the operational amplifier 3 to drop to the ground level (GND). As a result, the capacitor C3 is cleared by being discharged. At the same time, the capacitor Ca is similarly cleared by being discharged via the pulse drive circuit 2.

When the switch circuit 5 is turned off, a pulse signal is synchronously sent from the pulse drive circuit 2 to both capacitors Ca and Cb. The pulse signal passing through the capacitor Ca is applied to the inverting input of the operational amplifier 3, whereupon a current for charging the capacitor Ca flows in the path and thereby charges the capacitor Ca. The current flowing to the inverting input of the operational amplifier 3 is in proportion to the resulting charge buildup in the capacitor Ca. At the same time, a voltage output capable of holding the inverting input of the operational amplifier 3 at the ground potential develops at its output. In response to this output voltage, an electric current flows through the capacitor C3 to charge it. Since this charging operation occurs in such a direction that the operational amplifier 3 produces a negative output, the polarity of the capacitor C3 is as shown in FIG. 8, with the terminal to the inverting input of the operational amplifier 3 being positive and the terminal to the output being negative. As a consequence, the operational amplifier 3 produces the output voltage VA. Similarly, the operational amplifier 4 produces the output voltage VB.

Assume here that capacitor Ca is disposed in a specified detecting position and that its capacitance is changed by being touched by the operator or as the result of a metal coming close to it. If the capacitance of capacitor Cb does not change since it is a reference capacitor, the adder 8 provides an output spinal of a voltage level in inverse proportion to the change in the capacitance of the capacitor Ca. Thus, one can detect the touching of the capacitor Ca or the change in the position of the target.

Electrostatic digitizers, locator devices and other sensors typically employ the above-described charge current detector circuit as a basic circuit and comprise a matrix array of capacitors Ca each having an electrode that can be touched by the operator. The individual detecting capacitors Ca are sequentially selected by scanning with a multiplexer. The change in the capacitance of a selected capacitor that occurs relative to the adjacent capacitor as a result of touching or other events is detected in the manner just described above. Thus, the position of locating by touching or other events can be detected on the basis of multiplexer selection timing and the change in the capacitance of the selected capacitor.

In a charge current detector circuit having a detecting capacitor and a capacitor of a reference capacitance (or an adjacent capacitor), the detecting capacitor (Ca in FIG. 8) is usually provided in the detecting position, so it is wired to the operational amplifier 3 over a long distance. As a result, the capacitance of the capacitor Ca which is less than a hundred pF is highly sensitive to noise and the detected voltage will fluctuate to increase the chance of erroneous detection. In addition, the dynamic range of the detectable voltage is small since the change in an electric current to be detected is no greater than what develops in response to the change in capacitance due to an environmental change such as occurs when the operator touches the capacitor or if a metal object comes close to it. If the change in current is to be picked up by the operational amplifier, the offset of its operation will be a problem to the detecting operation.

To solve that problem, the Applicants previously invented a small current detector circuit which was less affected by noise in operation and they filed a U.S. patent application titled "Small Current Detector Circuit and Locator Device Using the Same", which was eventually granted as U.S. Pat. No. 5,783,951.

Returning to a locator device, X and Y electrodes in the electrostatic sensor portion are usually stripe electrodes thinner than the width of a finger which touches them. When an electrode is touched with a finger, the electric lines of force between X and Y electrodes are interrupted to reduce the capacitance of the touched electrode. As a result, there occurs a change in the difference of capacitance between the touched electrode and the adjacent one. When the difference in capacitance between an electrode pair and another electrode in a face-to-face relationship with the pair is successively detected by electrode-pair scanning with the small current detector circuit, the difference is positive and increases in the area upstream of the touched electrode. The difference then decreases and becomes zero in the position touched with a finger (the center of the finger) and thereafter increases taking a negative value. The difference then decreases to become zero again. This is the characteristic of the touch detection signal detected with the small current detector circuit. Briefly, the touch detection signal obtained by scanning X or Y electrode pairs with the small detector circuit varies in the scan direction in such a way that two peaks occur with reference to a specified level, one being greater and the other smaller (see FIG. 5a).

Since the touch detection signal obtained by electrode scan has such a waveform, the position of the touched electrode can theoretically be located by detecting the zero-crossing point between adjacent peaks. In practice, however, the electrostatic sensor portion comprises an array of X and Y electrodes of small width placed in a face-to-face relationship and the small variations that inevitably occur in the voltage applied to electrodes tend to deteriorate the S/N ratio. Particularly in the case where the capacitance between electrodes in the electrostatic sensor portion is very small on the pico order ranging from several to ten-odd picofarads, the waveform of the touch detection signal obtained by electrode scan is prone to be distorted and the reference level for the touch detection signal is subject to variations since the charge current to be finally detected is highly sensitive to the ambient. This lowers the precision of detection of the zero-crossing point between peaks. In addition, if the electrode pitch is very small (<1,000 $\mu$m) compared to the width of finger touch, it becomes even more difficult to locate the correct position of the touched electrode.

Under these circumstances, the locator device of the type of contemplated by the invention requires adjustments of the reference level and various circuits. In addition, variations are prone to occur between product lots and level adjustments are necessary for each lot. These facts all contribute to the increase in the number of production steps.

SUMMARY OF THE INVENTION

The present invention has been accomplished in order to solve these problems of the prior art and has as an object providing a small current detector circuit that is less affected by noise.

Another object of the invention is to provide a locator device using a small current detector circuit that is less affected by noise.

Yet another object of the invention is to provide a locator device that requires no readjustments for each product lot in assembly line and which yet is capable of correct detection of the position of an electrode touched with a finger.

The first and second objects of the invention can be attained by the combination of the following components: a first and a second capacitor; a pulse drive circuit which drives one terminal of each capacitor by a pulse signal and charges and discharges said capacitors in synchronism with the rise and fall of the applied pulse so as to generate a first and a second detection signal at the other terminal of each capacitor; a connection circuit having a first and a second input terminal for receiving said first and second detection signals, respectively, and a first and a second output terminal, said connection circuit connecting said first and second input terminals to said first and second output terminals, respectively, in synchronism with the rise of said pulse signal whereas said first input terminal is connected to said second output terminal and said second input terminal to said first output terminal in synchronism with the fall of said pulse signal; a current generator circuit which receives said first and second detection signals from said first and second output terminals, respectively, to generate a current representing the difference between the levels of said signals; and an integrator circuit for integrating the output current from said current generator circuit, either said first capacitor or said second capacitor or both being provided in the detection portion of the small current detector circuit or the locator device using that detector circuit.

Thus, a pulse is applied to both capacitors simultaneously and the capacitors are charged and discharged in synchronism with the rise and fall of the applied pulse so as to generate detection signals. The input terminals are connected to the output terminals in the connection circuit in such a way that the connection established in synchronism with the rise of the applied pulse is reverse to the connection established in synchronism with the fall of the pulse and the difference between the levels of the detection signal obtained upon charging and the detection signal obtained upon discharging is generated as an output of the same polarity (in-phase output). As a result, two differential current values are output per pulse from the current generator circuit. The two differential current values are cumulative in the integrator circuit to produce a differential current of twice the input value, thereby outputting an increased value of the detected difference current. Consequently, the S/N ratio for the detection of the differential current can be improved.

The third object of the invention can be attained by a locator device comprising the following components: a touch detecting portion having multiple electrodes arranged in a specified direction and a common electrode placed in a face-to-face relationship with said multiple electrodes; a pulse drive circuit which drives said common electrode in response to a pulse signal and with which two capacitors formed by a pair of adjacent electrodes selected in synchronism with either the rise or fall of the applied pulses are charged or discharged to generate a first and a second detraction signal in said pair of electrodes; a multiplexer which sequentially selects (scans) said pair of adjacent electrodes to receive said first and second detection signals; a current generator circuit which receives said first and second detection signals from said multiplexer to generate a current representing the difference between the levels of said signals; an integrator circuit which integrates the output current from said current generator circuit; reference level sampling means by which the voltage value of said integrator circuit which is obtained by scanning said pair of electrodes as a group with said multiplexer when neither of said electrodes in pair are touched is stored in correspondence with said selected electrode pair; cumulative value computing means which calculates a correction value by subtracting A from B, B being the voltage value of said integrator circuit obtained for said electrode pair selected by scanning with said multiplexer when either of said electrodes in pair is touched and A being the voltage value of said integrator circuit stored by said reference level sampling means in correspondence with said selected electrode pair, and which accumulates the calculated correction value for each updating of the selection of said electrode pair and which stores the cumulative value in correspondence with said updated electrode pair; and touch position detecting means by which said electrode pair which corresponds to a maximum of the cumulative values calculated by said cumulative value computing means or either one of said electrodes in pair is taken as the touched electrode and its position is detected.

The voltage value from the integrator circuit is a touch detection signal that varies in the scan direction (i.e., a specified direction of electrode arrangement) such that two peaks occur with respect to a specified reference level, one being greater and the other smaller. According to the invention, the voltage value which is output from the integrator circuit when either one of the electrodes in pair is untouched is sampled as a reference level in correspondence to said electrode pair and stored; the stored reference level for the electrode pair is substrated from the voltage value which is output from the integrator circuit when either one of the electrodes in pair is touched, thereby producing a correction value and conversion is made to produce a corrected touch detection signal having two peaks, one being greater and the other smaller than the ground level. With the selection of electrode pair updated, the correction values are accumulated successively by the cumulative value computing means. As a result, the zero-crossing position with respect to the ground level is converted to a peak of the cumulative value. This ensures that even if an electrode is touched with a finger wider than the electrode, the touch position can be located from the electrode position represented by the maximum cumulative value. As a consequence, the touch position can be detected with high precision.

If the touch detection signal is corrected in this way, the level of the voltage value from the integrator circuit can be corrected independently of the product but in a manner indicative of the status of the electrostatic sensor portion and the small current detector circuit as it is related to each correction. As a result, touch position can be detected precisely and easily and, in addition, there is no need to perform readjustments for each product in assembly line.

DESCRIPTION OF THE PREFERRED EMBODIMENT

Figure 1:
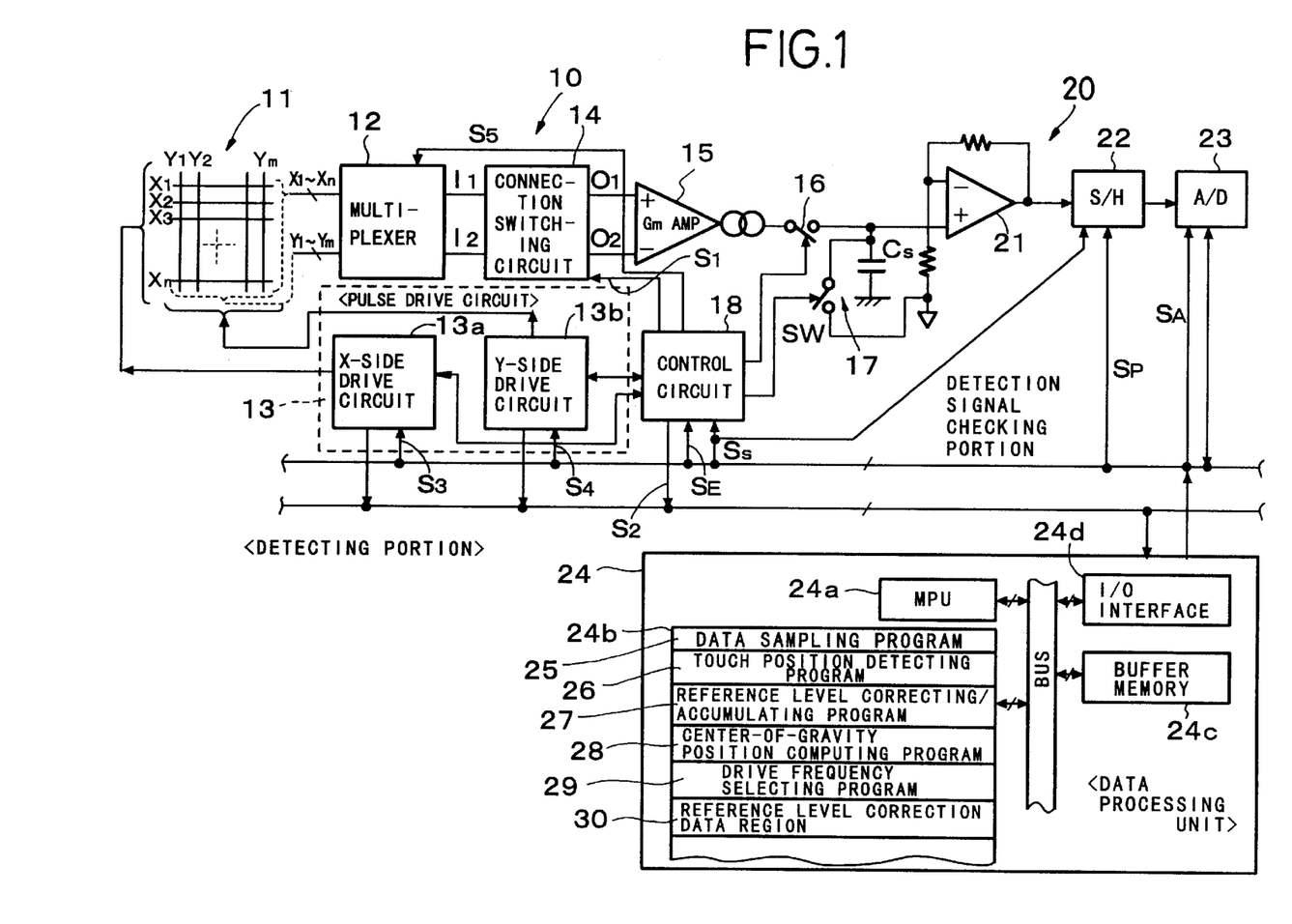
FIG. 1 is a block diagram of a locator device according to an embodiment of the invention.

Referring to FIG. 1, numeral 10 designates a detecting portion, 11 is the electrostatic sensor portion, 12 is a multiplexer, 13 is pulse drive circuit consisting of an X-side drive circuit 13a and a Y-side drive circuit 13b, 14 is a connection switching circuit, 15 is a differential current generator circuit, 16 is a switch circuit, 17 is an integrator circuit and 18 is a control circuit. The integrator circuit 17 consists of an integrating capacitor CS and a parallel-connected switch circuit SW for resetting the electric charges building up in the capacitor CS. Shown by 20 is a detection signal checking portion comprising an amplifier 21, a sample and hold (S/H) circuit 22, an A/D converter (A/D) circuit 23 and a data processing unit 24.

Figure 2:
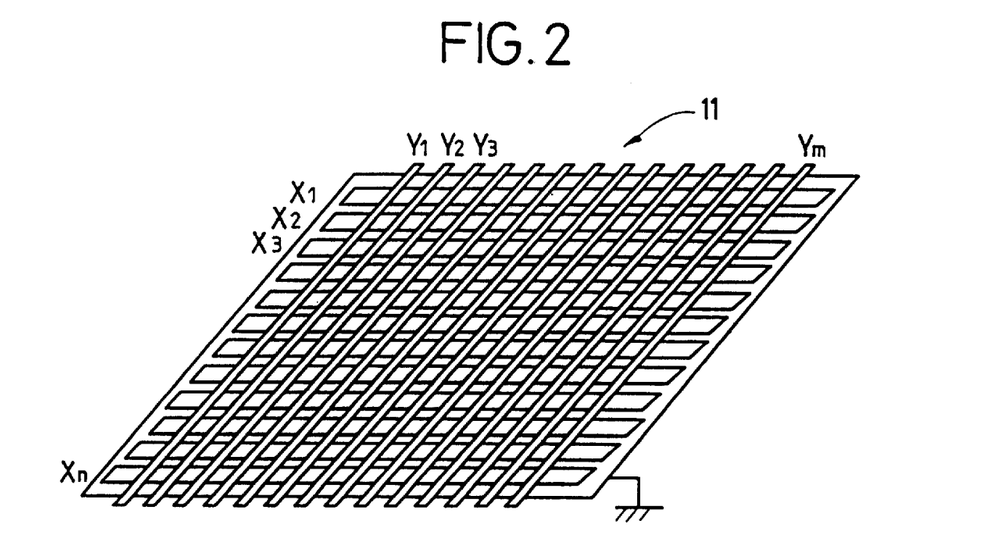
FIG. 2 is an illustration of the basic structure of an electrostatic sensor portion.

The electrostatic sensor portion 11 is a flat member which, as shown in FIG. 2, has multiple stripe electrodes X1, X2, . . . and Xn which are spaced in the X direction and multiple strip electrodes Y1, Y2, . . . and Ym which are spaced in the Y direction; these two electrode groups are provided in a face-to-face relationship and superposed on each other wish a dielectric resin spacer (not shown) interposed.

Two adjacent electrodes of either X or Y group are successively selected as a pair and driven by pulses supplied from the pulse drive circuit 13 via the electrodes of the other group Y or X. The selected electrodes are supplied with a constant level of voltage and the electrodes of the other group are driven simultaneously.

The two selected electrodes of either group correspond to two capacitors Ca and Cb (see FIG. 3) in relation to the electrodes of the other group. The difference between the capacitances of these two capacitors is output as a current value from the differential current generator circuit 15.

Figure 3:
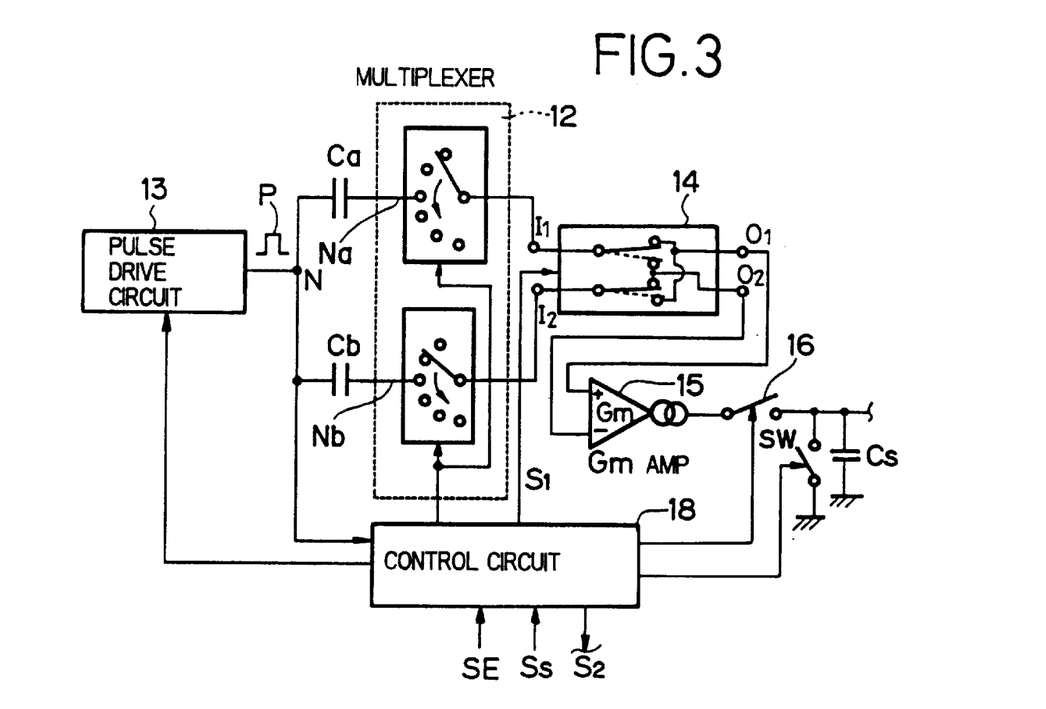
FIG. 3 illustrates how a pair of electrodes in the sensor portion are detected.

Referring now to FIG. 3, the multiplexer 12 first selects two adjacent overlying electrodes in the Y direction (see FIG. 2), shifted one by one, and when the selection of all electrode pairs ends, the multiplexer 12 then selects two adjacent electrodes in the X direction, also shifted one by one.

Stated more specifically, the selected electrodes in the Y direction are Y1/Y2, Y2/Y3, ... Yi-1/Yi, ... and Ym/Y1. It should be noted that the last electrode Ym pairs with the first electrode Y1. The next selected electrodes in the X direction are X1/X2, X2/X3, ... Xi-1/Xi, ... and Xn/X1. Again, the last electrode Xn pairs with the first electrode X1. In this way, the electrodes are selected successively by the multiplexer 12 and drive pulses are supplied from the pulse drive circuit 13. When the electrodes being selected are in the Y direction, the X-side drive circuit 13a generates drive pulses which are applied to the X electrodes, whereupon electrode pairs in the Y direction are scanned successively. The Y-side drive circuit 13b supplies a constant voltage to the individual Y electrodes. If the electrodes being selected are in the X direction, the Y-side drive circuit 13b generates drive pulses which are applied to the Y electrodes, whereupon electrode pairs in the X direction are scanned successively. In this case, the X-side drive circuit 13a supplies a constant voltage to the individual X electrodes. Which side of electrodes are driven and which are supplied with a constant voltage setting is determined by selection signals S3 and S4 supplied from the data processing unit 24.

If the X electrodes are selected for the driven side by selection signals S3 and S4 so that they are driven by pulses of such a voltage as HIGH level or Vcc, the Y electrodes are set at a constant voltage such as LOW level or Vcc/2 to be scanned in succession. Conversely, if electrodes Y1, Y2, ... and Ym are selected for the driven side, they are driven by pulses of such a voltage as HIGH level or Vcc. In this case, electrodes X1, X2, ... and Xn are set at a constant voltage such as LOW level or Vcc/2 to be scanned in succession. Electrode selection by the multiplexer 12 and the generation of drive pulses form the pulse drive circuit 13 are effected in response to control signals from the control circuit 18.

FIG. 3 shows a circuit for the successive selection of electrode pairs by the multiplexer 12. Two adjacent capacitors Ca and Cb selected by the multiplexer 12 under the control of the control circuit 18 correspond to the capacitors formed either by the selected Y electrode pair and the whole of X electrodes or by the selected X electrode pair and the whole of Y electrodes.

Figure 4A:
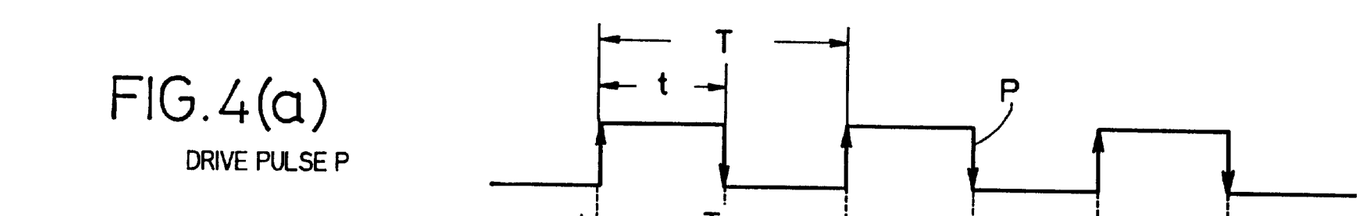
FIG. 4 is a timing chart for the detecting operation.
Figure 4B:
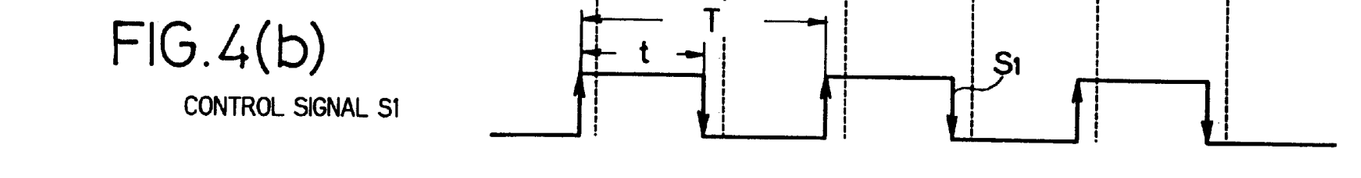

FIG. 4 is a timing chart for the detecting operation by means of the capacitors. If the multiplexer 12 selects two adjacent electrodes in the Y direction, one end N of each of the capacitors Ca and Cb which form a common junction (N is initially X electrodes) is supplied with a drive pulse P (see FIG. 4a). The other ends Na and Nb of the selected capacitors Ca and Cb (Na and Nb are initially Y electrodes) are input to the differential current generator circuit 15 via the multiplexer 12 and the connection switching circuit 14. The differential current generator circuit 15 is composed of a Gm amplifier (transconductance amplifier) and receives at the (+) and (−) phase terminals the voltage signals which develop at the other ends Na and Nb, respectively, of the capacitors Ca and Cb. The circuit 15 outputs a differential current value representing the potential difference between the two input signals.

The switch circuit 16 is turned on for a specified period and receives a control signal from the control circuit 18. As long as the switch circuit 16 is on, the output of the differential current generator circuit 15 is sent to the capacitor CS in the integrator circuit 17 which is charged with the output current from the circuit 15. The output current is generated by the difference between the capacitances of the two capacitors and represents the difference between the charge currents flowing through them.

In response to a control signal S1 (see FIG. 4b) from the control circuit 18, the connection switching circuit 14 establishes the connection indicated by the solid lines in synchronism with the rise of S1 and establishes the connection indicated by the dashed lines in synchronism with the fall of S1. In the connection timed with the rise of S1 which is indicated by the solid lines, the first input I1 is connected to the first output O1 and the second input I2 is connected to the second output O2. In the connection timed with the fall of S1 which is indicated by the dashed lines, the first input I1 is connected to the second output O2 and the second input I2 is connected to the first output O1.

The drive pulse P and the control signal S1 are such that they have the same pulse width but that the control signal S1 has a phase lead over the drive pulse P. Therefore, the control signal S1 rises before the drive pulse P rises and falls before the drive pulse P falls. As a results, when the drive pulse P rises, the connection switching circuit 14 establishes the connection indicated by the solid lines and when the drive pulse P falls, the connection indicated by the dashed lines is established.

It should be noted that the pulse width of the drive pulse P is set to be equal to time t longer than the time when the charging of capacitor Ca or Cb ends and the period T is more than twice t (2t<T).

Figures 4C, 4D:
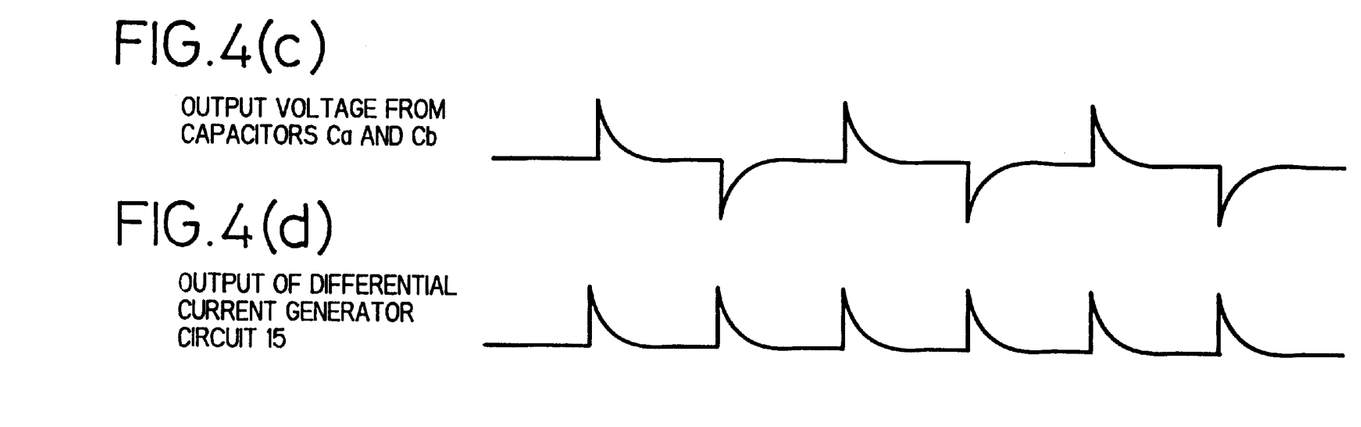

In synchronism with the rise and fall of the drive pulse P, a voltage signal as shown in FIG. 4c develops as a transient phenomenon at the other ends Na and Nb of capacitors Ca and Cb. The voltage signal generated by this transient phenomenon is applied to the (+) and (−) phase terminals of the differential current generator circuit 15. Due to the connection switching circuit 14, the waveform of the differential voltage across the two terminals has the same polarity (phase) at the rise and fall of the drive pulse P. Hence, a current signal as shown in FIG. 4d is output from the differential current generator circuit 15. As a result, the capacitor CS in the integrator circuit 17 is charged twice per drive pulse by the current which is generated at the rise and fall of the drive pulse P and the resulting charges build up in the capacitor CS. FIG. 4d refers to the case of Ca>Cb and a current signal of opposite polarity will develop when Ca<Cb.

In the embodiment under consideration, the switch circuit 16 in FIG. 1 is controlled by the control circuit 18 and remains on for a time period corresponding to 16 drive pulses P. Therefore, the capacitor CS in the integrator circuit 17 is supplied with a current corresponding to approximately 32 drive pulses which charge the capacitor. The terminal voltage value which develops in the capacitor CS as the result of this charging is amplified by the amplifier 21 in the detection signal checking portion 20 and applied to the sample and hold (S/H) circuit 22, where it is sampled by a sampling signal SP from the control circuit 18. The sampled value is input to the A/D converter 23, where it is converted to a digital value which, in turn, is input to the data processing unit 24. The switching circuit 16 may be turned on for a longer period corresponding to more than 16 drive pulses P; for example, a suitable ON period may be selected from the range corresponding up to about 30 drive pulses.

The terminal of capacitor CS (i.e., (+) input of amplifier 21) as well as its (−) is connected to a bias terminal of a specified voltage which is Vcc/2 in the embodiment under consideration. Therefore, if switch SW is turned on, capacitor CS is preset to the bias voltage Vcc/2. When the capacitances of capacitors Ca and Cb on the detection side satisfy the relation Ca>Cb, the current output from the differential current generator circuit 15 provides a "drain", so capacitor CS is charged to a higher voltage than the bias voltage Vcc/2. If Ca<Cb, the current output from the differential current generator circuit 15 provides a "sink", so capacitor CS is discharged to a lower voltage than the bias voltage Vcc/2. If Ca=Cb, no current output will develop in the differential current generator circuit 15, so the charging voltage of capacitor CS becomes equal to the bias voltage Vcc/2.

As already mentioned in connection with the prior art, when either one of the electrodes is touched with a finger, the finger working as a conductor interrupts the electric lines of force to reduce the capacitance of the touched electrode. Assume here that capacitor Ca in FIG. 3 is a certain electrode whereas capacitor Cb is an adjacent electrode. As for the capacitors formed of a pair of electrodes (X or Y electrodes) which are just upstream of the touched electrode and the electrode in the other direction (Y or X electrode), their capacitances satisfy the relation Ca>Cb; on the other hand, as for the capacitors formed of a pair of electrodes which are just downstream of the touched electrode and the electrode in the other direction, their capacitances satisfy the relation Ca<Cb. In the area near the center touched with the finger, Ca=Cb. As for the untouched electrodes in the electrostatic sensor portion 11, Ca=Cb. In the case under consideration, the touching finger is wider than each electrode, so many electrodes which are either upstream or downstream of the touched electrode are affected to produce a touch detection signal as shown in FIG. 5*a*.

Figure 5A:
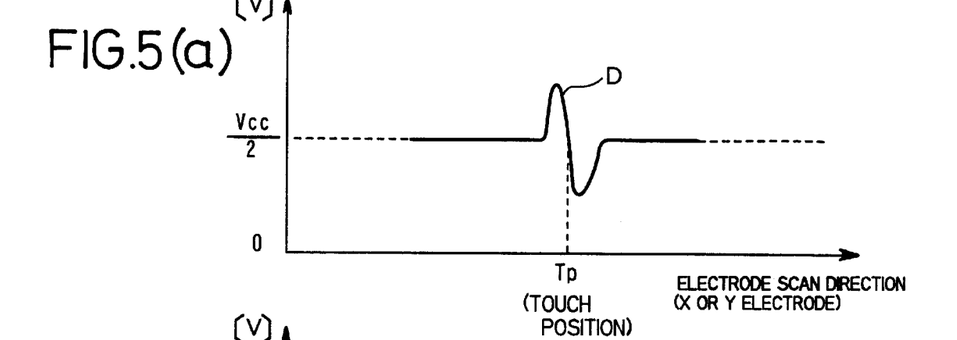
FIGS. 5a–5c illustrate how the waveform of a detection signal varies.

As a result, the amplifier 21 produces an output voltage which is a touch detection signal D having two peaks with respect to the reference voltage Vcc/2, one being greater and the other smaller as shown in FIG. 5*a*. The horizontal axis of the graph in FIG. 5*a* represents the direction of electrode scan in which electrodes are arranged in an ordered number sequence. In the waveform of the touch detection signal D, the touch position corresponding to the center of the touch width of the finger is point TP where the waveform curve crosses Vcc/2 and the position of the corresponding electrode number is equal to the touch position of the finger.

The sample and hold (S/H) circuit 22 samples the touch detection signal D at multiple points in correspondence with the electrodes being scanned and sends it to the A/D converter 23. As a result, the touch detection signal D is converted to a digital value and sent to the data processing unit 24.

As already mentioned, electrode scanning is performed on each electrode pair but in the embodiment under consideration, the touch detection signal D shown in FIG. 5*a* is dealt with as a touch detection signal which corresponds to the upstream electrode of each pair. Therefore, in the following description, the detection signal is assumed to result from one electrode rather than a pair of electrodes. It should, however, be noted that the detection signal may be dealt with either as resulting from an electrode pair or as resulting from the downstream electrode of each pair.

Figure 5B:
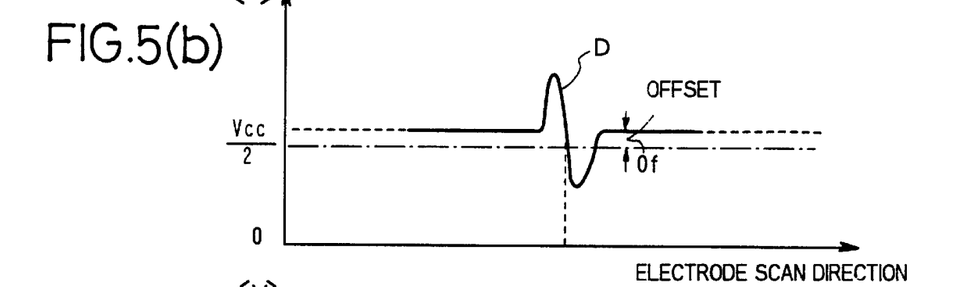

Referring now to the touch detection signal D, it is so closely related to the electrostatic sensor portion 11 that not only does the reference voltage level of Vcc/2 shift but also a variation occurs with each product. Hence, an offset (Of) occurs as shown in FIG. 5*b* and, what is more, it is by no means constant. To deal with this situation, the reference level of Vcc/2 which is variable from the ground (GND) level for the case where no electrode is touched with a finger is sampled in association with successive electrodes. To this end, the data processing unit 24 has a data sampling program 25.

Figure 5C:
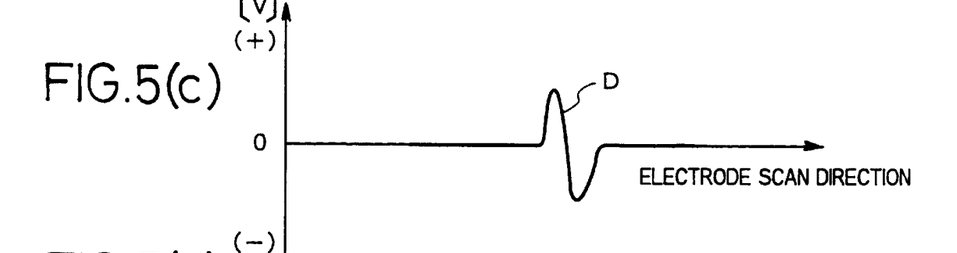
Figure 5D:
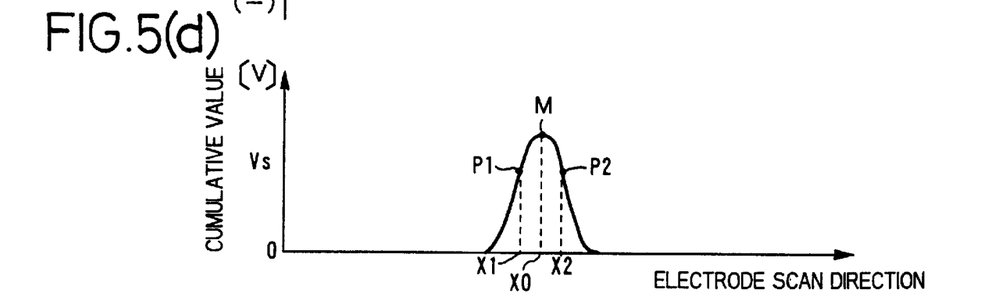
FIG. 5d illustrates the resulting cumulative value.

When the touch detection signal on each event of scan is corrected by subtracting the variable reference level of Vcc/2 (with respect to the ground level GND) from the level of that touch detection signal, the touch detection signal D will assume the waveform shown in FIG. 5*c*. The thus corrected sampling value is stored and successive stored values are added up. In the ideal case where the positive peak level in FIG. 5*c* is equal to the negative peak level, the cumulative value obtained by addition continues to increase up to the zero-crossing point and thereafter decreases to eventually become zero. Thus, the cumulative value VS assumes the waveform shown in FIG. 5*d*. It should be noted that even if the waveform of the touch detection signal D is distorted more or less, there will be no offset in the position of the cumulative maximal value. Hence, a reference level correcting/accumulating program 27 is provided in the data processing unit 24 as a program for performing the above-described integrating process.

If the X and Y electrodes are so small in width that the position of a maximal value obtained by the integrating process does not necessarily fit, three electrode positions, one for-the maximal value and the two being at equal distances on both sides, are sampled and the center of gravity is determined from the positions of these three values and the accumulated value and the electrode at a position the closest to the center of gravity is located as the one at the touched position (in coordinates). The data processing unit 24 has a center-of-gravity computing program 28 as a special program for calculating the center of gravity.

The data processing unit 24 having those programs will now be described with reference to FIG. 1. As shown, the data processing unit 24 comprises basically a MPU 24*a*, a memory 24*b* storing various processing programs, a buffer memory 24*c* and an I/O interface 24*d*. The memory 24*b* stores in it data sampling program 25, touch position detecting program 26, reference level correcting/accumulating program 27, center-of-gravity computing program 28, drive frequency selecting program 29, etc. The memory 24*b* also contains a reference level correction data region 30.

The data sampling program 25 is executed when any other programs are not being executed. This program first determines whether any of the electrodes in the electrostatic sensor portion 11 is touched with a finger. If the answer is affirmative, the touch position detecting program 26 is called and executed; if the answer is negative, the relevant data is sampled as data on the reference level of Vcc/2 in order to perform an offset cancelling process. Depending on the need, the data sampling program 25 also calls the drive frequency selecting program 29 so as to change the frequency of the drive pulse to be applied to the individual electrodes to be scanned (which will be described later in this specification).

The touch position detecting program 26 is executed when any of the electrodes is touched with a finger and successively calls the reference level correcting/accumulating program 27 and the center-of-gravity computing program 28 so that they are executed by the MPU 24*a* to detect the position of the touched electrode.

Figure 6:
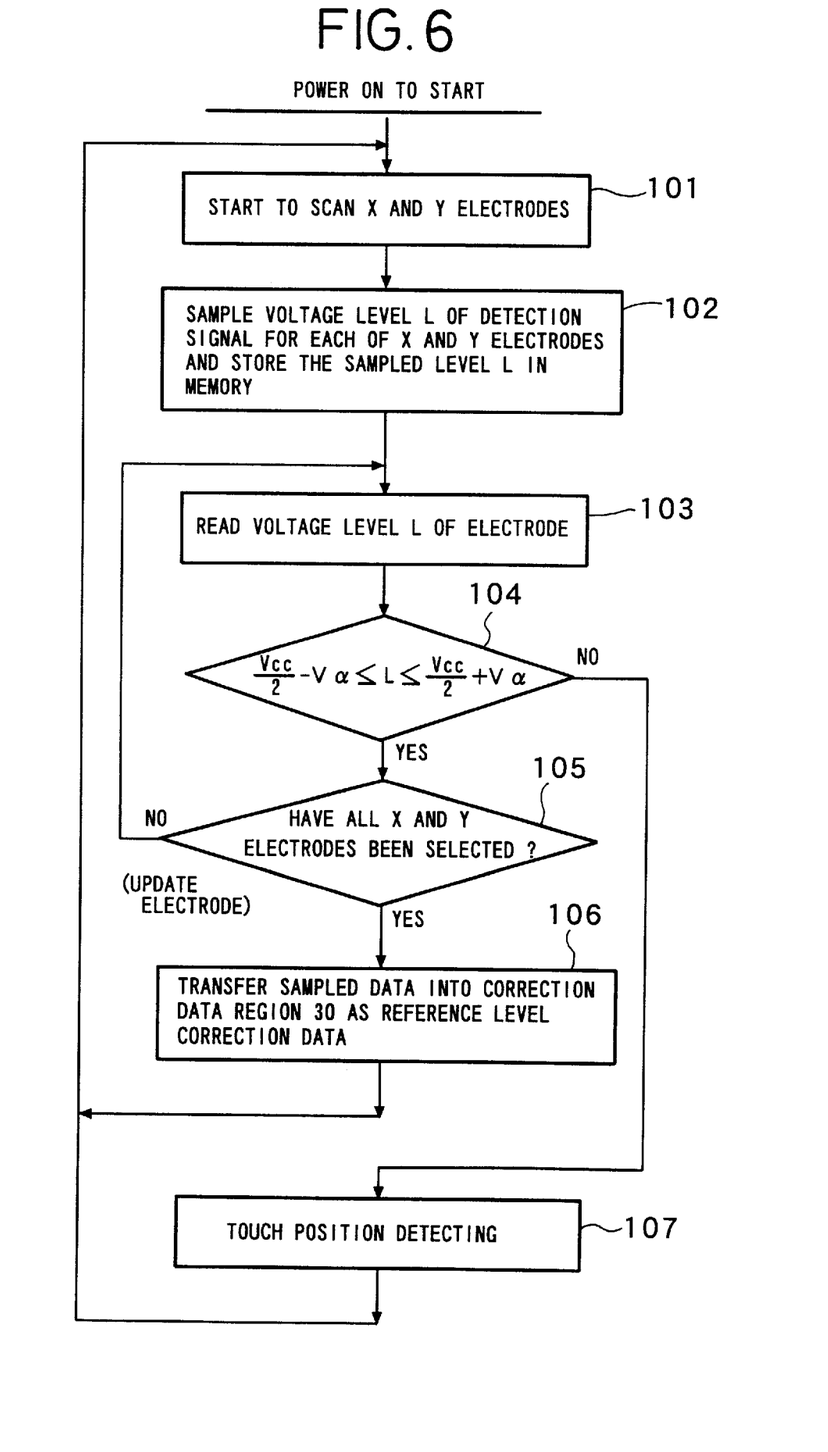
FIG. 6 is a flowchart for the sequence of data sampling process on the detection signal.
Figure 7:
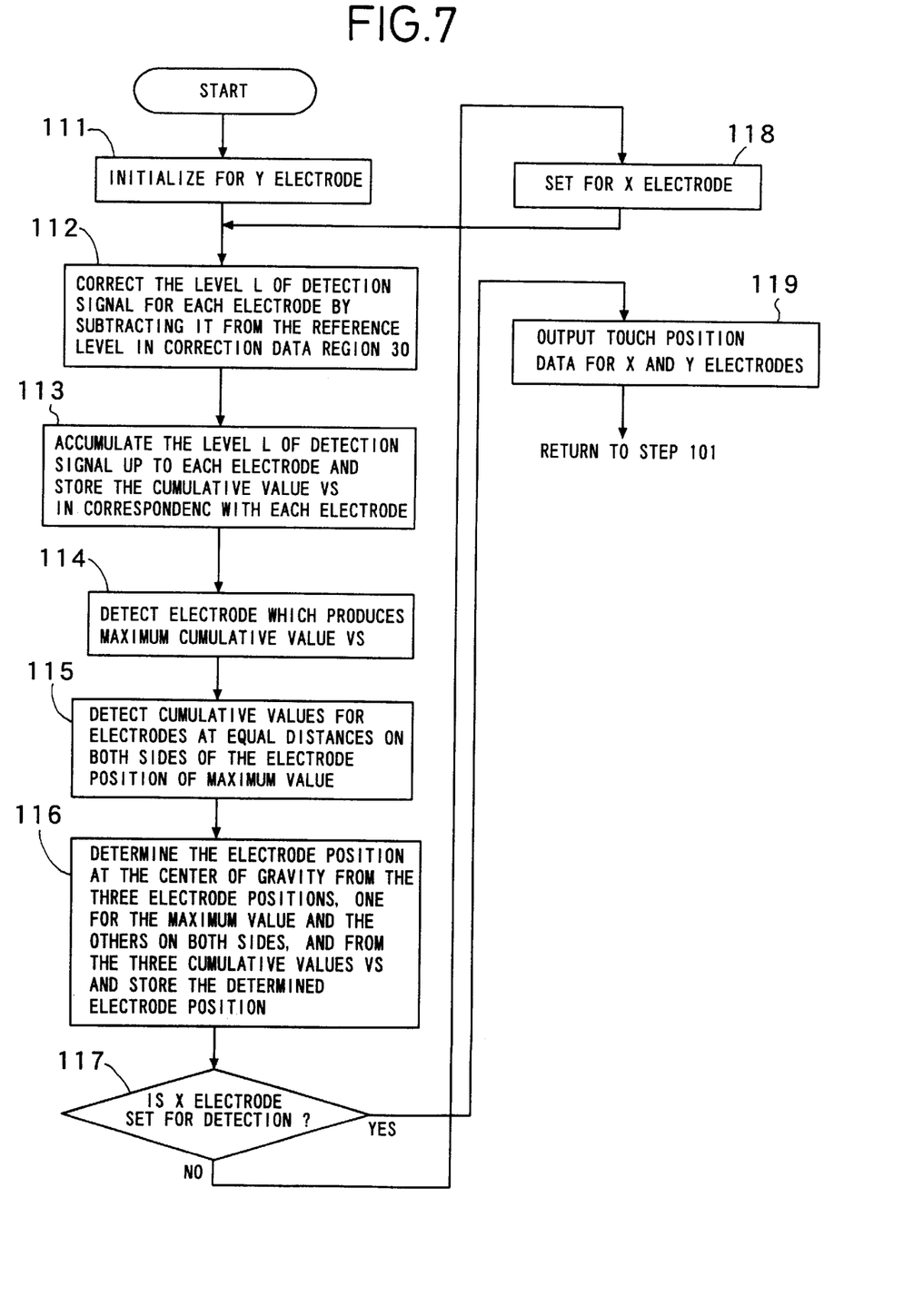
FIG. 7 is a flowchart for the sequence of touch position detecting process.

The execution of the programs mentioned above will now be described with reference to FIGS. 6 and 7. FIG. 6 shows the flow of processing with the data sampling program 25. When the process is started by turning on the power supply, XY electrode scan, in which the scan of X electrodes is followed by the scan of Y electrodes, starts (step 101) and the voltage levels L of detection signals for individual electrodes on the X and Y sides are acquired as data and stored in buffer memory 24*c* in correspondence with the respective electrodes (step 102).

Let us first describe the process of sampling detection signals by the data processing unit 24 in steps 101 and 102. The MPU 24a in the data processing unit 24 first generates a control signal SS and, upon receiving a control signal S2 from the control circuit 18, executes the data sampling program 24b, sends a sample and hold signal SH and an A/D conversion signal SA, performs A/D conversion on the sampled and held output voltage value from the amplifier 21 and stores the obtained data in the buffer memory 24c. Thereafter, the MPU 24a sends a control signal SS for measurement start to the control circuit 18 via the I/O interface 24d. In response to the control signal SS, the held value in the sample and hold circuit 22 is also reset.

The data processing unit 24 first generates a selection signal S3 for causing X-side drive circuit to generate drive pulses so that the control circuit 18 controls the selection of electrodes in the Y direction; the data processing unit 24 then generates a selection signal S4 for causing the Y-side drive circuit to generate drive pulses so that the control circuit 18 controls the selection of electrodes in the X direction and until all electrodes in the Y and X directions are selected, each time it receives a control signal S2, the data processing unit 24 receives similar data from A/D converter 23, samples them, stores them in the buffer memory 24c and sends out a control signal SS for starting the measurement. When measurement of all electrodes in the Y and X directions ends, the data processing unit 24 send a measurement end signal SE to the control circuit 18 and stops its operation. It should be noted that the order of electrode selection may be reversed and the selection of electrodes in the X direction may precede the selection of electrodes in the Y direction.

Each time it receives the control signal SS for measurement start from the data processing unit 24, the control circuit 18 turns on the switch circuit SW and then presets the capacitor CS at a bias voltage (say, Vcc/2). It then drives the multiplexer 12 to send out a control signal for selecting the next pair of electrodes and turns on the switch circuit SW. At the same time, the control circuit 18 sends out a control signal S1 to the connection switching circuit 14 and drives the pulse drive circuit 13.

The control circuit 18 receives drive pulses P from the pulse drive circuit 13 (see FIG. 2) and counts them. When it counts up 16 drive pulses P, the control circuit 18 turns off the switch circuit SW and sends out a control signal S2 for measurement end to the data processing unit 24.

Thus, after receiving the first control signal SS for measurement start from the data processing unit 24, the control circuit 18 performs such control that two adjacent electrodes in the Y direction are selected in the order of Y1/Y2, Y2/Y3, ... Yi-1/Yi, ... and Ym/Y1 as it receives the control signal SS; then, the selection shifts to the electrodes in the X direction and two adjacent X electrodes are successively selected in the order of X1/X2, X2/X3, ... Xi-1/Xi, ... and Xn/X1. For each selected electrode pair, a control signal S2 is sent out when 16 drive pulses P have been counted and a control signal S5 for changeover to the next electrode is sent out to the multiplexer 12.

In the next place, the MPU 24a sends out a measurement end signal SE to the control circuit 18 and the process goes to step 103 shown in FIG. 6. In step 103, the voltage level L of the detection signal for the first electrode is read out of the buffer memory 24c and in step 104, check is made as to whether the voltage level L satisfies the relation Vcc/2−Vα≦L≦Vcc/2+Vα.

If the answer is affirmative, check is made as to whether all electrodes on the X and Y sides have been selected (step 105). If the answer is negative, the process returns to step 103 and the voltage level L of the detection signal for the next electrode is read and the same checking is made. If, as the result of repeating the same procedure in a circular manner, the answer to the question asked in step 105 becomes affirmative and if the voltage level L of the detection signal lies within the range of the checking in step 104 for all of the selected electrodes, one may safely conclude that none of the electrodes in the electrostatic sensor portion 11 have been touched with a finger; in other words, it is determined that no signal having the waveform shown in FIG. 5a has developed.

In the above description, ±Vα designates voltage limits of the reference range to check for the presence or absence of a touch detection signal D of the level shown in FIG. 5a. It should be noted here that the upper limit of the reference may be set at +Vα whereas the lower limit may assume a different voltage value such as −Vα'.

When no part of the electrostatic sensor portion 11 is found to have been touched with a finger, the data sampled for individual electrodes are transferred as data to correct the reference level of Vcc/2 for offset cancelling and stored in the associated X- and Y-side electrode regions of the reference level correction data region 30 in the memory 24b (step 106) and the process returns to step 101.

Thus, in the case where no electrode has been touched with a finger, correction data of the latest reference level on each of the X and Y sides are stored at all times in the reference level correction data region 30 in correspondence with the individual X and Y electrodes.

If the answer to the question raised in step 104 is negative, one may well conclude that a signal of the level shown in FIG. 5a exists at the electrode position on either X or Y side. Hence, the touch position detecting program 26 is called and executed by the MPU 24a to perform touch position detecting (step 107). Subsequently, the reference level correcting/accumulating program 27 is called and executed by the MPU 24a and with respect to the voltage value L of the detection signal for each of the current electrodes (which are first on the Y side and then on the X side) sampled in the buffer memory 24c, the correction data already stored in correspondence with the individual electrodes (the data representing the reference level of Vcc/2 for each of the untouched electrodes) are read out of the reference level correction data region 30 and the process of subtracting the voltage value of the correction data from the voltage value L of the detection signal is performed in association with each electrode and the result is stored in the working area (RAM) of the memory 24b (step 112 in FIG. 7). As a consequence, offset is eliminated from the reference level of each electrode and, at the same time, the reference level is reduced to the ground level. In analog terms, this is equivalent to the production of a signal having the waveform shown in FIG. 5c and the relevant data is obtained in correspondence with each electrode.

In the next place, the corrected voltage value L of the detection signal for each electrode is accumulated upon each electrode updating from the first electrode to the currently selected electrode and in correspondence with each of the updated electrodes, the cumulative value VS for the electrodes ranging from the first to the updated electrode is stored and this integration process is continued up to the last electrode and the result is stored in the working region (step 113). In analog terms, this is equivalent to the production of a signal having the waveform shown in FIG. 5d. Subsequently, the center-of-gravity computing program 28 is called and executed by the MPU 24a and a maximal value M is first detected from the data for the cumulative value VS in the working region and, in addition, the electrode associated with that maximal value M is detected (step 114). Then, data are detected for the cumulative values P1 and P2 in two adjacent electrode positions that are at equal distances front the electrode position of the maximal value M (step 115). Finally, the electrode position at the center of gravity is calculated from a total. of three cumulative values, one being the maximal cumulative value and the two being on both sides thereof, and a total of three electrode positions associated with those cumulative values and the actual electrode position which is the nearest to the electrode position at the calculated center of gravity is taken as being associated with the currently scanned touched electrode and stored in memory 24b as the position of the touched electrode on the currently set detection side (initially on the Y side) (step 116). The position of this touched electrode corresponds to the touch position TP in FIG. 5a.

Subsequently, check is made as to whether the electrode to be detected is on the X side or not (step 117). If not, the answer is negative and the electrode to be detected is set as being on the X side (step 118) and the process returns to step 112 and the X electrodes are subjected to the same processing as described above to identify the electrode in touch position TP.

If the answer to the question asked in step 117 is affirmative (i.e., the electrode to be detected is on the X side), the data on the electrodes in the touch position on both X and Y sides are output (step 119) and the process returns to step 101 in FIG. 6.

Thus, the points of change from Ca>Cb to Ca=Cb and from Ca=Cb to Ca<Cb are given in terms of electrode numbers in both Y and X directions and detected as touch positions.

In the embodiment under consideration, the differential current generator circuit 15 is comprised of a Gm amplifier but this is not the sole case of the invention and all that is required by the circuit 15 is that it provide a "drain" or "sink" of an output current in accordance with the level difference between the charge currents through two capacitors, thereby charging and discharging the integrating capacitor. In FIGS. 4c and 4d, the waveform of a detection signal is shown as a voltage waveform but a current waveform will also assume the same shape. Therefore, if a current signal is to be output as a detection signal, a current amplifier may be employed as the differential current generator circuit 15.

If desired, the small current detector circuit described in U.S. Pat. No. 8,728,382 which uses a current mirror as a current outputting amplifier with improved S/N ratio may be substituted for the differential current generator circuit 15.

The last topic to be discussed is the drive frequency selection program 29. This program is called by the data sampling program 25 before the start of data sampling so as to select the frequency of electrode driving pulses. For frequency selection, the frequency dividing ratio of the frequency dividing circuit (not shown) in the pulse drive circuit 13 is selected to change the frequency of drive pulses. A specific example of the frequency to be selected is either one of 105 kHz, 133 kHz, 167 kHz and 200 kHz.

The frequency selection is typically performed in the failure of detection of the touch position or when the touch position in either one of X and Y directions is indefinite. The reason is as follows: switching power supply used in a computer or the like may inadvertently be turned on at a specific wavelength to generate pulse noise or a clock generator circuit may generate a signal of the MHz order due typically to the operation of a MPU or the like. The generated pulse becomes noise which enters the electrostatic sensor portion 11 to either change the detection signal or cause erroneous detection. If position detection cannot be performed correctly due to the necessity of preventing those problems, a shift to another drive frequency will generate an optimal touch detection signal D to achieve correct position detection.

For the sake of convenience, the foregoing description of the process of detecting the touch position assumes that each pair of electrodes is managed with reference to the number assigned to either the upstream or downstream electrode of the pair. Needless to say, every electrode pair may be managed as such in the order of numbers assigned to individual pairs. In this alternative case, data of detection values sampled in correspondence with electrode pair are managed with reference to numbers different from those assigned to the upstream or downstream electrode of the pair.

In the embodiment described above, the position of a touched electrode is determined in terms of the center of gravity as determined by the center-of-gravity process; however, whether the center of gravity should be determined or not depends on the electrode pitch and if this is not very small, the electrode corresponding to the position of a maximal cumulative value may simply be taken as the electrode in the touch position.

In the embodiment, checking for the touching of a certain electrode with a finger is made by measuring the level of a touch detection signal but this is not the sole case of the invention and touch detection may be performed with a separate detector for detecting the difference between the capacitances of X and Y electrodes as occurs upon touching with a finger.

In the embodiment, a circuit is employed that outputs a voltage value representing the detection current value by generating a plurality of drive pulses and integrating them. However, it is not necessarily required in the invention to integrate a plurality of drive pulses over the time period of their generation.

The description of the embodiment centers on a locator device comprising multiple electrodes arranged in Y and X directions. However, as will be understood from the waveforms of touch detection signal D shown in FIG. 5, the invention is also applicable to a locator device that outputs a detection signal of the illustrated waveform and which recognizes the crossing with the reference level as a touch position.

What is claimed is:

1. A small current detector circuit comprising: a first and a second capacitor; a pulse drive circuit which drives one terminal of each capacitor by a pulse signal and charges and discharges said capacitors in synchronism with the rise and fall of the applied pulse so as to generate a first and a second detection signal at the other terminal of each capacitor; a connection circuit having a first and a second input terminal for receiving said first and second detection signals, respectively, and a first and a second output terminal, said connection circuit connecting said first and second input terminals to said first and second output terminals, respectively, in synchronism with the rise of said pulse signal whereas said first input terminal is connected to said second output terminal and said second input terminal to said first output terminal in synchronism with the fall of said pulse signal; a current generator circuit which receives said first and second detection signals from said first and second output terminals, respectively, to generate a current representing the difference between the levels of said signals; and an integrator circuit for integrating the output current from said current generator circuit, at least one of said first capacitor and said second capacitor being provided in detection portion of the detector circuit.

2. The small current detector circuit according to claim 1, wherein both said first and second capacitors are provided in said detecting portion.

3. The small current detector circuit according to claim 2, wherein said current generator circuit provides a drain or sink of said output current in accordance with said difference between the levels of said signals and wherein said integrator circuit integrates the output current of said current generator circuit for a plurality of said pulse signals.

4. A locator device comprising: a first and a second capacitor; a pulse drive circuit which drives one terminal of each capacitor by a pulse signal and charges and discharges said capacitors in synchronism with the rise and fall of the applied pulse so as to generate a first and a second detection signal at the other terminal of each capacitor; a connection circuit having a first and a second input terminal for receiving said first and second detection signals, respectively, and a first and a second output terminal, said connection circuit connecting said first and second input terminals to said first and second output terminals, respectively, in synchronism with the rise of said pulse signal whereas said first input terminal is connected to said second output terminal and said second input terminal to said first output terminal in synchronism with the fall of said pulse signal; a current generator circuit which receives said first and second detection signals from said first and second output terminals, respectively, to generate a current representing the difference between the levels of said signals; and an integrator circuit for integrating the output current from said current generator circuit, a plurality of said first capacitors being provided in a detection portion of the locator device and continuously selected in succession.

5. The locator device according to claim 4, wherein both said first and second capacitors are provided in said detecting portion.

6. The locator device according to claim 5, which further includes a multiplexer for selecting two adjacent capacitors among said plurality of capacitors and wherein said current generator circuit provides a drain or sink of said output current in accordance with said difference between the levels of said signals, wherein the two capacitors selected by said multiplexer are said first and second capacitors, respectively, and wherein said integrator circuit integrates the output current of said current generator circuit for a plurality of said pulse signals.

7. The locator device according to claim 6, wherein said first and second capacitors are formed between a pair of adjacent ones of multiple electrodes which are provided in said detecting portion as arranged in a specified direction and a common electrode provided in a face-to-face relationship with said pair of adjacent electrodes, wherein said multiplexer selects successive pairs of electrodes and wherein said common electrode is supplied with said pulse signal from said pulse drive circuit.

8. A locator device comprising: a touch detecting portion having multiple electrodes arranged in a specified direction and a common electrode placed in a face-to-face relationship with said multiple electrodes; a pulse drive circuit which drives said common electrode in response to a pulse signal and with which two capacitors formed by a pair of adjacent electrodes selected in synchronism with either the rise or fall of the applied pulse are charged or discharged to generate a first and a second detection signal in said pair of electrodes; a multiplexer which sequentially selects said pair of adjacent electrodes to receive said first and second detection signals; a current generator circuit which receives said first and second detection signals from said multiplexer to generate a current representing the difference between the levels of said signals; an integrator circuit which integrates the output current form said current generator circuit; reference level sampling means by which the voltage value of said integrator circuit which is obtained by sequentially selecting said pair of electrodes as a group with said multiplexer when neither of said electrodes in pair are touched is stored in correspondence with said selected electrode pair; cumulative value computing means which calculates a correction value by subtracting A from B, B being the voltage value of said integrator circuit obtained for said electrode pair selected by sequential selection with said multiplexer when either of said electrodes in pair is touched and A being the voltage value of said integrator circuit stored by said reference level sampling means in correspondence with said selected electrode pair, and which accumulates the calculated correction value for each updating of the selection of said electrode pair and which stores the cumulative value in correspondence with said updated electrode pair; and touch position detecting means by which said electrode pair which corresponds to a maximum of the cumulative values calculated by said cumulative value computing means or either one of said electrodes in pair is taken as the touched electrode and its position is detected.

9. The locator device according to claim 8, which further includes a connection circuit provided between said multiplexer and said current generator circuit to receive said first and second detection signals at said first and second input terminals, respectively, and which in synchronism with the rise of said pulse signal connects said first and second input terminals to a first and a second output terminal, respectively, so as to output said first and second detection signals and which in synchronism with the fall of said pulse signal connects said first input terminal to said second output terminal and said second input terminal to said first output terminal so as to generate said first and second detection signals, and detection means for detecting the touch of any one of said electrode pairs and wherein said pulse drive circuit charges and discharges the two capacitors formed of said pair of adjacent electrodes which are successively selected by said multiplexer in synchronism with the rise and fall of said pulse signal, and wherein said cumulative value computing means comprises correction value computing means for calculating said correction value and storing it in correspondence with said electrode pair and accumulating means by which the correction value stored in correspondence with said electrode pair is accumulated upon each updating of said electrode pair and which stores the cumulative value in correspondence with said electrode pair.

10. The locator device according to claim 9, wherein said integrator circuit integrates the output current of said current generator circuit for a plurality of said pulse signals and wherein said multiple electrodes comprise a plurality of X electrodes arranged in a grid pattern in the X direction and a plurality of Y electrodes arranged in a grid pattern in the Y direction, with pairs of adjacent electrodes in either X or Y direction being successively selected and the electrodes in the other direction being said common electrode, and wherein said detection means is checking means for checking as to whether any one of said electrode pairs has been touched by a method in which the voltage of said integrator circuit obtained in correspondence with each of said electrode pairs is compared with a specified reference level, wherein said accumulating means is such that the correction value calculated in correspondence with said electrode pair or either one of the electrodes in pair is accumulated upon each updating of said electrode pair in said electrodes in both X and Y directions and stored in correspondence with said updated electrode pair or either one of the electrodes in pair, and wherein said touch position detecting means are such that said electrode pair which corresponds to a maximum of the cumulative values calculated by said cumulative value computing means or either one of said electrodes in pair is detected as the touched electrode among said X and Y electrodes.

11. The locator device according to claim 10, wherein all of said Y electrodes work as said common electrode when said X electrodes are successively selected by said multiplexer whereas all of said X electrodes work as said common electrode when said Y electrodes are successively selected by said multiplexer.

12. The locator device according to claim 11, which further includes a processor and a memory and wherein said checking means, said reference level sampling means, said correction value computing means, said accumulating means and said touch position detecting means are materialized by execution with said processor of programs that are associated with said respective means and which are stored in said memory and when none of said programs other than the one associated with said checking means are executed by said processor, the program for said checking means is executed and said touch position detecting means takes two correction values for said electrode pair at equal distances on both sides of the position of said electrode pair corresponding to a maximal value and determines as the touch position the position of the electrode which is the closest to the position of the center of gravity which is determined by said two correction values and said maximal value.

* * * * *